United States Patent
Griffin et al.

(10) Patent No.: US 12,069,104 B2
(45) Date of Patent: Aug. 20, 2024

(54) DYNAMIC MANAGEMENT OF ROLE-BASED ACCESS CONTROL SYSTEMS

(71) Applicant: Red Hat, Inc., Raleigh, NC (US)

(72) Inventors: Leigh Griffin, Waterford City (IE); Cathal O'Connor, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 213 days.

(21) Appl. No.: 17/680,700

(22) Filed: Feb. 25, 2022

(65) Prior Publication Data

US 2023/0275931 A1    Aug. 31, 2023

(51) Int. Cl.
    *H04L 9/40*        (2022.01)
(52) U.S. Cl.
    CPC ................... *H04L 63/205* (2013.01)
(58) Field of Classification Search
    CPC ... H04L 63/205; H04L 63/0263; H04L 63/10; H04L 63/102; H04L 63/20
    See application file for complete search history.

(56) References Cited

U.S. PATENT DOCUMENTS

| | | | |
|---|---|---|---|
| 7,886,335 B1 * | 2/2011 | Chickering | H04L 43/0817 726/1 |
| 10,289,406 B2 | 5/2019 | Shani et al. | |
| 10,380,367 B2 | 8/2019 | Griffin | |
| 10,713,664 B1 | 7/2020 | Alagappan et al. | |
| 10,949,528 B1 * | 3/2021 | Attfield | H04L 63/0428 |
| 2005/0256947 A1 | 11/2005 | Devarakonda | H04L 41/0894 709/223 |
| 2009/0228951 A1 * | 9/2009 | Ramesh | H04L 69/321 726/1 |
| 2012/0311672 A1 * | 12/2012 | Connor | H04L 63/10 726/4 |
| 2015/0269383 A1 * | 9/2015 | Lang | G06F 21/57 726/1 |
| 2017/0126687 A1 | 5/2017 | Martinelli | |
| 2017/0214696 A1 * | 7/2017 | Cleaver | H04L 63/104 |
| 2020/0382508 A1 * | 12/2020 | Asiri | H04L 67/306 |
| 2021/0226774 A1 | 7/2021 | Padmanabhan | |
| 2023/0353572 A1 * | 11/2023 | Griffin | H04L 63/101 |

FOREIGN PATENT DOCUMENTS

| | | | | |
|---|---|---|---|---|
| CN | 101505248 A | * | 8/2009 | ......... H04L 12/2602 |
| CN | 109688120 A | * | 4/2019 | ............ H04L 63/10 |
| CN | 112906029 B | | 9/2021 | |

* cited by examiner

*Primary Examiner* — Michael R Vaughan
(74) *Attorney, Agent, or Firm* — Womble Bond Dickinson (US) LLP

(57) ABSTRACT

A method includes determining that access permissions associated with a service of a computing system have been revoked, identifying one or more access policy sets including access policy rules associated with the service, removing the access policy rules associated with the service from the one or more access policy sets, and marking one or more decision execution paths of a policy decision point associated with the service with a feature flag.

20 Claims, 9 Drawing Sheets

DYNAMIC MANAGEMENT OF ROLE-BASED ACCESS CONTROL SYSTEMS

TECHNICAL FIELD

Aspects of the present disclosure relate to cloud data storage, and more particularly, to dynamic management of role based access control systems.

BACKGROUND

Role based access control (RBAC) systems is a security scheme in which define roles and/or attributes are defined for users, groups of users, devices, services, etc. The roles and attributes are then used to define access policies to data, files, services, and computing resources. For example, policy sets can be defined for access to each resource such that only users, devices, or services that are assigned certain roles or attributes have permissions to access (e.g., read/write/modify) the resources.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
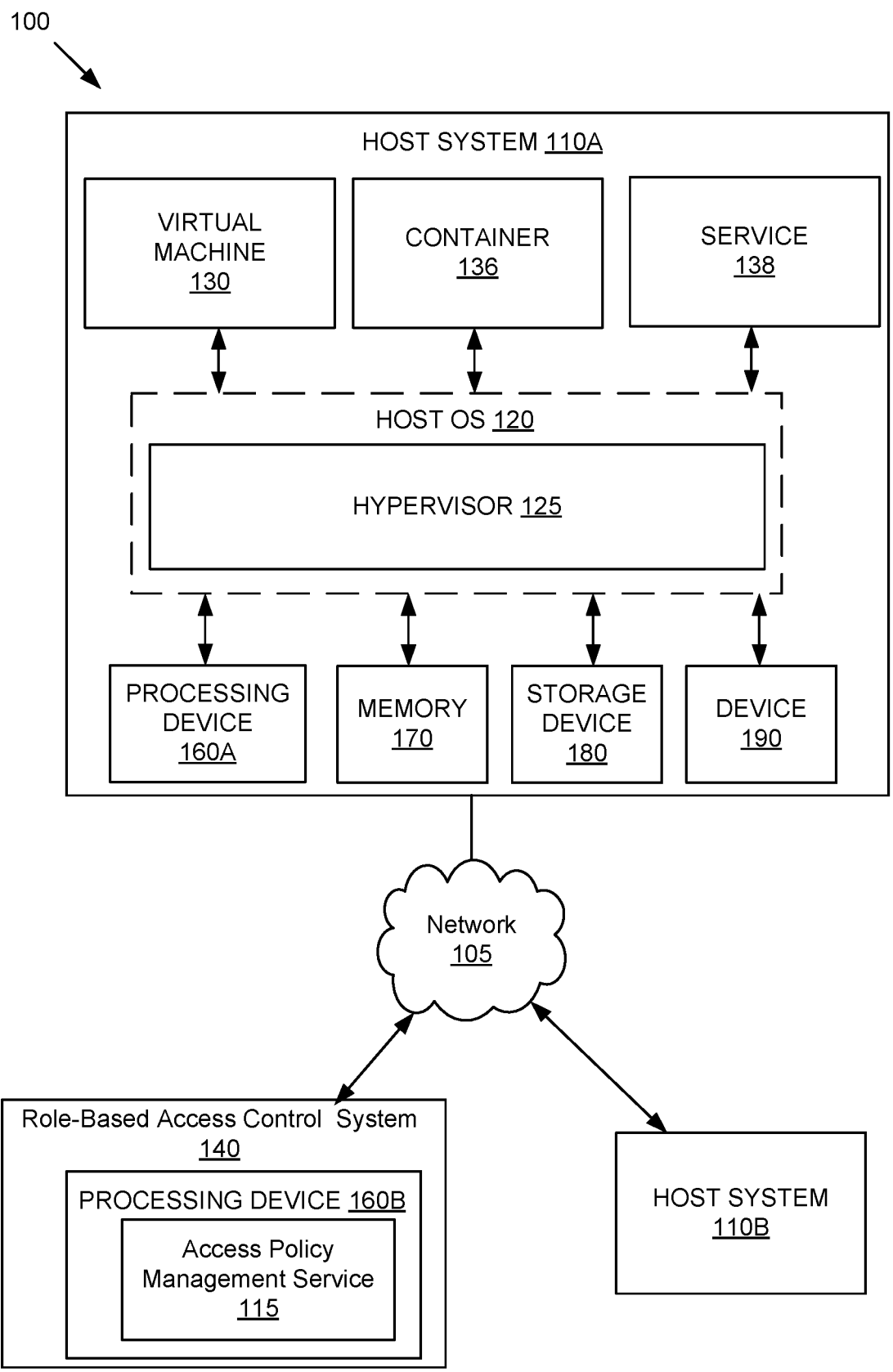
FIG. 1 is a block diagram that illustrates an example computer architecture, in accordance with some embodiments.

Resource access permission management in computer systems determines which users and devices can access particular resources of the system. In many systems, the management of resource access can or should be performed dynamically depending on the usage of the services and applications executing on the system. For example, mobile devices may have limited resources which may be unnecessarily utilized by applications that are no longer used or necessary for the mobile device or user for the mobile device. The mobile device may thus remove access permissions from applications that have not been active or used for a predetermined threshold of time to optimize resource utilization and prevent unnecessary access permissions for applications. In conventional RBAC systems, however, which encode a set of rules for access, such dynamic updating of service/application permissions may result in bloated rule-bases and large logical sections of policy decision point logic being active for permissions that no longer exist or are not needed.

Aspects of the present disclosure address the above-noted and other deficiencies by providing an access policy management service to dynamically update policy sets and policy decision logic according to dynamic permissions management of the system. The access policy management service may monitor for a service (e.g., application, program, device, etc.) permission changes in a system (e.g., from an operating system). Upon determining that a permission change for a service has occurred (e.g., if the service has been removed from the computing system), access policy sets (e.g., policy sets of a role-based access system) that include access policies associated with the service are identified. The access policy management service then removes the access policies that are associated with the service from the policy sets of the RBAC system. In some examples, the access policy management service may identify the access policies by comparing a service identifier (ID) of the service with each of the access policies defined by the policy sets to determine if any of the access policies are for the service.

In some examples, the access policy management service further identifies decision execution paths in the code of a policy decision point (PDP) of the RBAC system that are associated with the service for which permissions have been revoked. The access policy management service may identify the decision execution paths that include a reference to the service ID of the revoked service. The access policy management service may then insert feature flags (e.g., feature flag annotations) in the PDP code that indicate that the decision execution path associated with revoked service is not to be executed. Thus, the feature flags may effectively remove the access policy decisions associated with the revoked service from being performed by the PDP.

In some examples, the access policy management service executes a script for updating the PDP to remove the decision execution paths associated with the revoked service from the PDP code. For example, the script may be executed with a virtual machine or container to update a version of the PDP while the current PDP continues to operate. Thus, the script may update the PDP to remove the PDP and perform validation and verification that the PDP operates as expected all within the virtual machine or container. Once the updated PDP is verified and validated, the script may deploy the updated PDP to replace the current PDP. For example, all new incoming access requests may be forwarded to the update PDP and the current PDP may continue to assess any access requests remaining in the queue.

By providing a dynamic method for access policy management in an RBAC system, the present disclosure avoids downtime of the RBAC system to perform updates while maintaining updated and current permissions. Furthermore, by using feature flags to prevent execution of decision execution paths of revoked services the updates can functionally be performed immediately. The PDP update script can then be performed to remove unnecessary code to avoid bloated rule bases and overly convoluted code paths thus resulting in more efficient use of storage and processing resources of the computing system.

FIG. 1 depicts a high-level component diagram of an illustrative example of a computer system architecture 100, in accordance with one or more aspects of the present disclosure. One skilled in the art will appreciate that other computer system architectures are possible, and that the implementation of a computer system utilizing examples of the invention are not necessarily limited to the specific architecture depicted by FIG. 1.

As shown in FIG. 1, computer system architecture 100 includes host systems 110A-B and role-based access control (RBAC) system 140. The host systems 110A-B and RBAC system 140 include one or more processing devices 160A-B, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing devices 160A-B. It should be noted that although, for simplicity, host system 110A is depicted as including a single processing device 160A, storage device 180, and device 190 in FIG. 1, other embodiments of host systems 110A may include a plurality of processing devices, storage devices, and devices. Similarly, privacy preservation platform 140 and host system 110B may include a plurality of processing devices, storage devices, and devices. The host systems 110A-B and RBAC system 140 may each be a server, a mainframe, a workstation, a personal computer (PC), a mobile phone, a palm-sized computing device, etc. In embodiments, host systems 110A-B and RBAC system 140 may be separate computing devices. In some embodiments, host systems 110A-B and/or RBAC system 140 may be implemented by a single computing device. For clarity, some components of RBAC system 140 and host system 110B are not shown. Furthermore, although computer system architecture 100 is illustrated as having two host systems, embodiments of the disclosure may utilize any number of host systems.

Host system 110A may additionally include one or more virtual machines (VMs) 130, containers 136, and host operating system (OS) 120. VM 130 is a software implementation of a machine that executes programs as though it were an actual physical machine. Container 136 acts as an isolated execution environment for different functions of applications. The VM 130 and/or container 136 may be an instance of a serverless application or function for executing one or more applications of a serverless framework. Host OS 120 manages the hardware resources of the computer system and provides functions such as inter-process communication, scheduling, memory management, and so forth.

Host OS 120 may include a hypervisor 125 (which may also be known as a virtual machine monitor (VMM)), which provides a virtual operating platform for VMs 130 and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120. Although depicted and described herein as used within an RBAC system, embodiments of the present disclosure may be used in any compatible access control system or security scheme.

The host systems 110A-B and RBAC system 140 may be coupled (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of host systems 110A-B and/or RBAC system 140. In some embodiments, host system 110A and 110B may be a part of RBAC system 140. For example, the virtual machines 130 and/or containers 136 of host system 110A and 110B may be a part of a physical or virtual network managed by the RBAC system 140.

In embodiments, processing device 160B of the RBAC system 140 may execute an access policy management service 115. The RBAC system 140 may manage service and device access (e.g., host systems 110A-B) to a network (e.g., network 105) and/or resources of a device and/or network. For example, RBAC system 140 may manage access permissions for a service 138 executed by host system 110A to processing device 160A, memory 170, storage device 180, device 190, the network 105, or host system 110B. The RBAC system 140 may include policies to manage service or device access to any other service, device, or other resource of the computing system (e.g., network, device, etc.) managed by the RBAC system 140.

In some examples, the access policy management service 115 monitors when a service managed by the RBAC system 140 has had its permissions revoked (e.g., has been removed/uninstalled from the computing system). A service, as referred to herein, may include a physical device, a virtual device, an application, a script, a process, or any other service that may request access to use one or more resources managed by the RBAC system 140. The access policy management service 115 may identify and remove access policies (also referred to herein as "access rules") associated with the service from policy sets. The access policy management service 115 may further mark decision execution paths within code of a policy decision point (PDP) of the RBAC system 140 with feature flags. The feature flags may prevent the PDP from executing the decision execution paths associated with the revoked service. The access policy management service 115 may further execute a script to remove the decision execution paths of the PDP associated with the revoked service and to validate and verify the updated PDP to ensure that the updated PDP operates as expected. Further details regarding the anonymization service 115 will be discussed at FIGS. 2-7 below.

Figure 2:
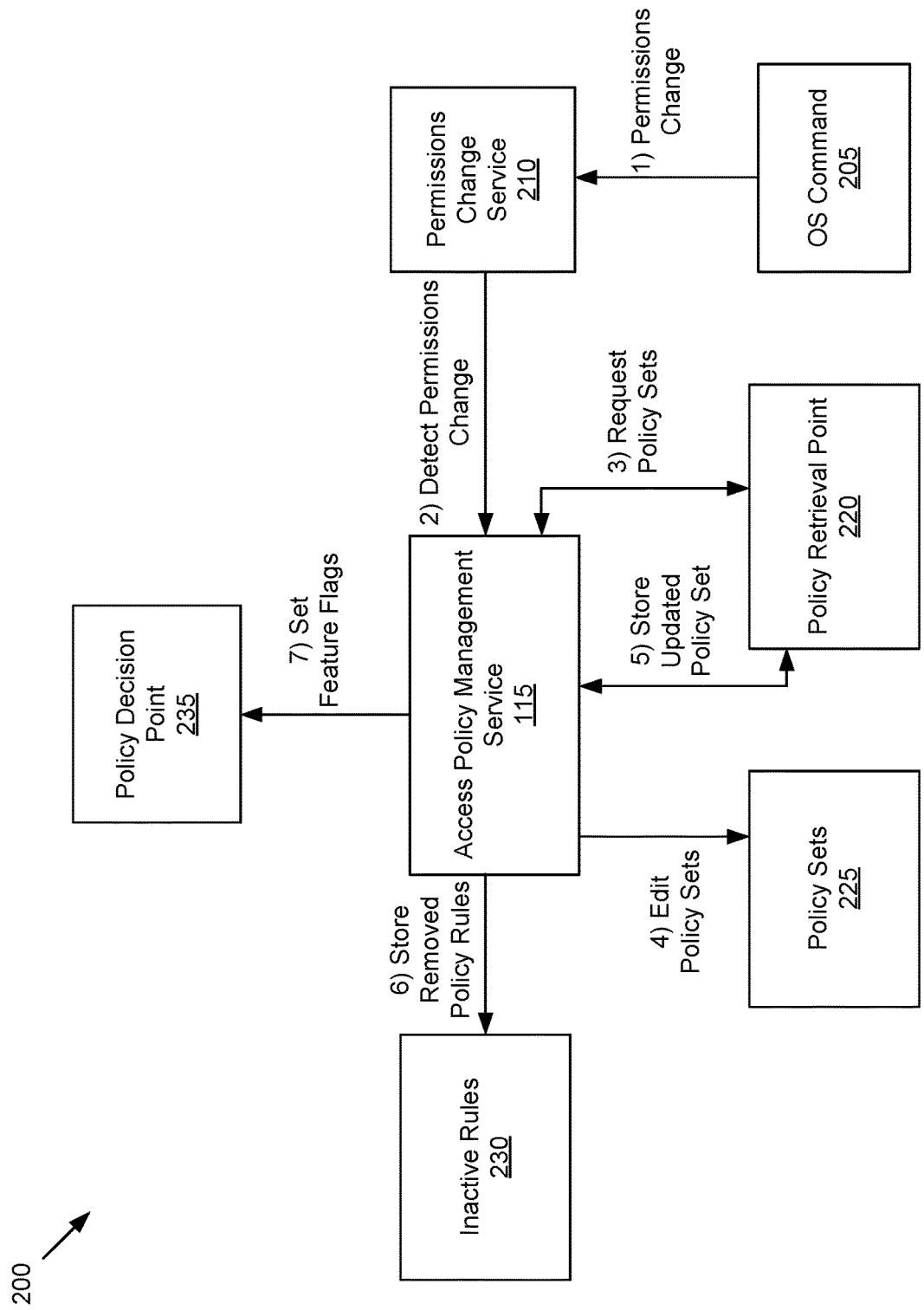
FIG. 2 is an illustration of an example of a computer system architecture for access policy management in a rule-based access control system, in accordance with embodiments of the disclosure.

FIG. 2 depicts an example of a system 200 for access policy management in an RBAC system, in accordance with embodiments of the disclosure. The system 200 may be an RBAC system for performing access control to resources of a computing system. The system 200 includes an access policy management service 115 which may be the same or similar to access policy management service 115 described with respect to FIG. 1. The system 200 further includes one or more policy sets 225, a policy retrieval point 220, a policy decision point 235, and one or more inactive rules 230. In some examples, the system 200 includes a permissions change service 210 to receive an OS command 205 to change permissions associated with a service managed by the system 200. The access policy management service 115 may monitor the permissions change service 210 to detect when a permissions change for a service has occurred. In one example, the access policy management service 115 may periodically query the permissions change service 210 to determine if a permissions change for a service has occurred. In other examples, the permissions change service 210 may actively notify the access policy management service 115 of the permissions change. In some examples, the access policy management service 115 may continuously monitor the permissions change service 210 for a change in permissions of a service. In some examples, the permission change of a service may be in response to removal/un-install of the service from the computing system in which case all access permissions associated with the service are to be removed from the system 200.

In response to determining that a permissions change for a service has occurred, the access policy management service 115 may request policy sets 225 from policy retrieval point (PRP) 220 that are associated with the service for which permissions have been changes. The PRP 220 may be a database storing the policy sets 225 for retrieval during evaluation of an access request. In some examples, the service may be identified by a service ID that uniquely identifies the service within the RBAC system. The policy sets 225 may be documents or files including a list of access policies and rules. For example, the access policy sets 225 may conform to the extensible Access Control Markup Language (XACML) standard. The service ID may be used to define access policies for the service within the policy sets 225 and to validate/deny resource access requests received from the service. The access policy management service 115 may identify each access policy/rule within the policy sets 225 that are associated with the service (e.g., via the service ID of the service). For example, the access policy management service 115 may perform a comparison of the service ID with each access policy of the policy sets 225 to identify the access policies defined for the service ID. The access policy management service 115 may then remove the identified access policies from the policy sets 225. Alternatively, if the access permissions change included the addition of a new service or new permissions of the service, the access policy management service 115 may include new or additional access rules to the policy sets 225 according to the newly added permissions. The access policy management service 115 may then store the updated policy sets 225 back to the policy retrieval point 220 for future use. In some examples, the access policy management service 115 may store removed access policies/rules 230 in a separate location or database in case a reversion of the policy sets is necessitated at a later point in time. For example, the updated policy sets 225 may result in conflicting or inoperable rule sets in which case a roll back to previous rules may be performed.

According to the depicted embodiment, the access policy management service 115 may further update a policy decision point (PDP) 235 according to the permissions changes in addition to editing the policy sets 225 associated with the service. PDP 235 may be a software service (e.g., code) implementing the access policy rules. In some examples, the PDP may implement the access policy rules via chains of logical boolean expressions (e.g., if-else statements). In the depicted embodiment, the access policy management service 115 may mark decision execution paths in the code of the PDP 235 that are associated with the revoked service with a feature flag. For example, the access policy management service 115 may identify execution paths of the PDP 235 that include a reference to the service ID of the revoked service. The feature flag may indicate that the execution path associated with the feature flag (e.g., immediately following the feature flag) is not to be executed. Thus, the execution paths marked with the feature flags are functionally removed from the PDP 235 operation but without requiring the downtime to manually update and replace the PDP 235.

Figure 3:
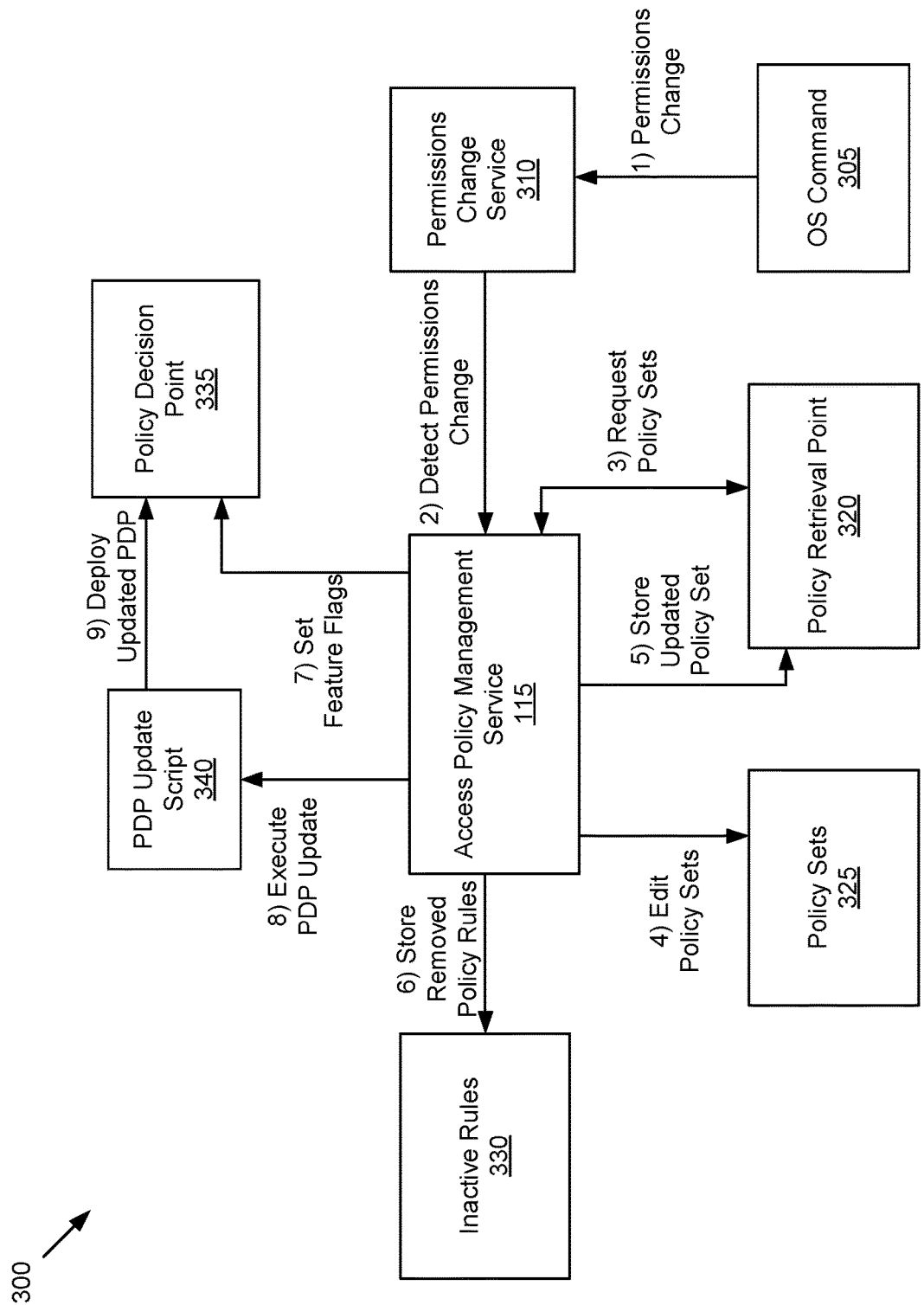
FIG. 3 depicts another example system of a computer system architecture for access policy management in a rule-based access control system, in accordance with some embodiments.

FIG. 3 is an example of a system 300 for access policy management in an RBAC system, in accordance with embodiments of the disclosure. The system 300 may substantially similar to system 200 described with respect to FIG. 2. System 300 may include access policy management service 115, a PRP 320, policy sets 325, and a PDP 335, each of which may be the same or similar to corresponding access management service 115, PRP 220, policy sets 225, and PDP 335 described with respect to FIG. 2. Similar to FIG. 2, a permissions change service 310 may receive an OS command 305 including a permissions change to one or more services managed by the system 300. Access policy management service 115 may monitor the permissions change service 310 to detect when a permissions change has occurred. The access policy management service 115 may then identify and retrieve policy sets 325 from PRP 320 that are associated with a service ID of the one or more services for which permissions have changed. The access policy management service 115 may then edit the policy sets 325 according to the permission changes. For example, if permissions have been revoked for a service then each access policy rule associated with the service is removed from the policy sets 325. The access policy management service 115 then stores the updated policy sets at the PRP 320. In some examples, the access policy rules removed from the policy sets 325 may be stored separately with inactive rules 330 that may be retrieve and restored at a later point in time if a roll back is initiated.

In the depicted example, the access policy management service 115 further marks decision execution paths of the PDP 335 that are associated with the revoked service with a feature flag indicating that the execution path is not to be executed. Setting of the feature flags may include inserting annotations within the code of the PDP 335 at specific points associated with the decision execution paths of the revoked service. Such annotations may be performed quickly without little to no downtime of the RBAC system. Thus, the RBAC system may temporarily continue to provide access control with updated policies using the feature flags to prevent execution of decision paths associated with the removed service.

The access policy management service 115 may further execute a PDP update script 340 to completely remove the decision execution paths associated with the removed service. In some examples, as described in further detail with respect to FIG. 4 below, the access policy management service 115 may instantiate a virtual environment in which to execute the PDP update script 340. For example, the PDP update script 340 may retrieve a copy of the current PDP 335 as annotated with the feature flags and update the PDP 335 within the virtual environment. The PDP update script 340 may then perform verification and validation on the updated PDP within the virtual environment. Once the updated PDP script is verified and validated, the PDP update script 340 may then deploy the updated PDP in place of the current PDP 335. For example, all new incoming resource access requests may be forwarded to the updated PDP script while the current PDP 335 addresses the access requests remaining in the queue that were received before deploying the updated PDP. In some examples, the PDP update script 340 may be an Ansible Playbook™ script.

Figure 4A:
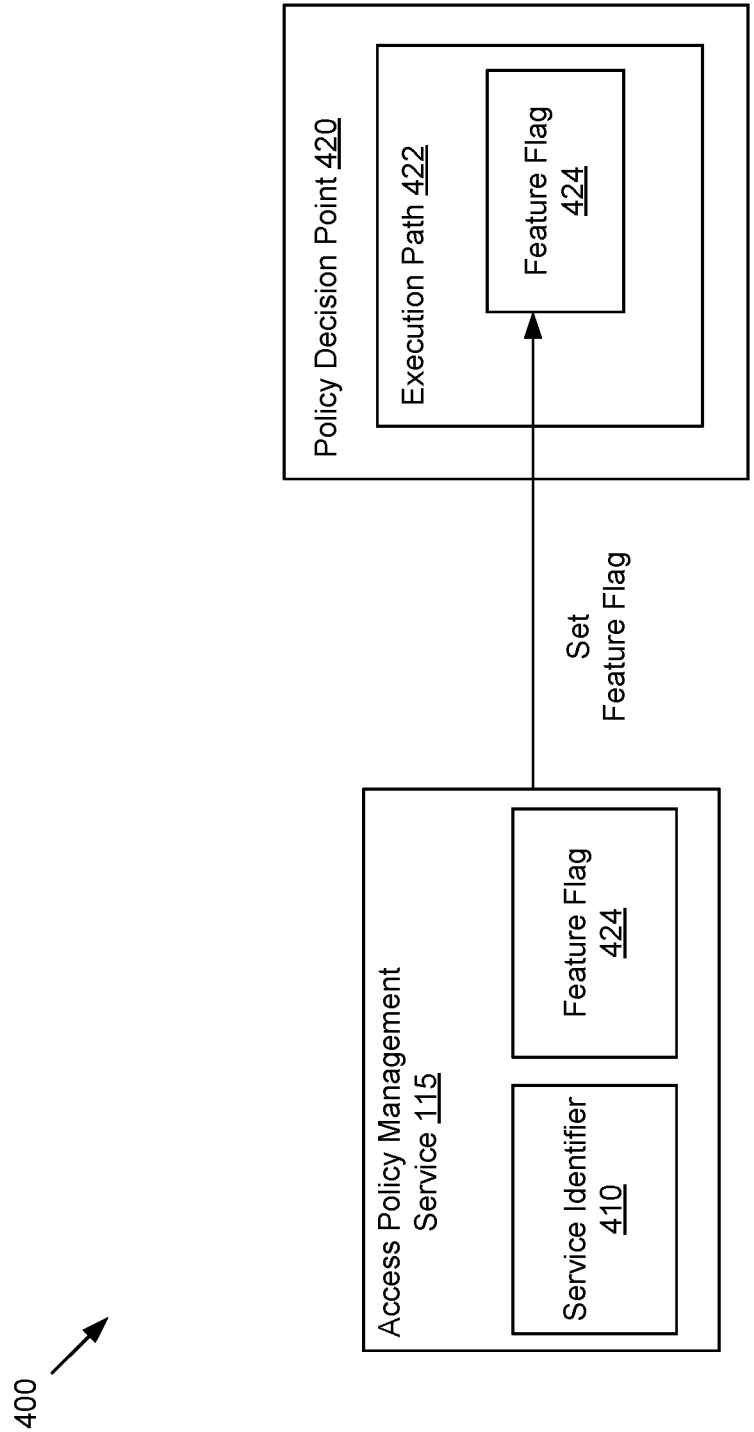
FIG. 4A depicts an example system for updating a policy decision point in a rule-based access control system, in accordance with some embodiments.

FIG. 4A is an example of a system 400 for access policy management in an RBAC system, in accordance with embodiments of the disclosure. The system 400 may include access policy management service 115 and PDP 420, each of which may be the same or similar to access policy management service 115 and PDP 220 and PDP 320 described with respect to FIG. 2 and FIG. 3. In the depicted embodiment, the access policy management service 115 sets a feature flag 424 at an execution path 422 of the PDP 420 in response to a permissions update associated with a service (e.g., permissions being revoked for the service). The access policy management service 115 may perform a search of the code of the PDP 420 to identify one or more execution paths of the PDP 420 that are associated with access rules for the revoked service. For example, the access policy management service 115 may determine a service identifier (ID) 410 of the revoked service and search the code of the PDP for execution paths referencing the service identifier. The access policy management service 115 may then annotate the execution path 422 with the feature flag 424 to indicate that the PDP 420 should no longer execute the execution path 422. Thus, the PDP 420 may operate as though the execution path 422 were removed from the PDP 420. In some examples, the access policy management service 115 may annotate the execution path 422 with the feature flags 424 with little to no down time of the PDP 420 and the associated RBAC system.

Figure 4B:
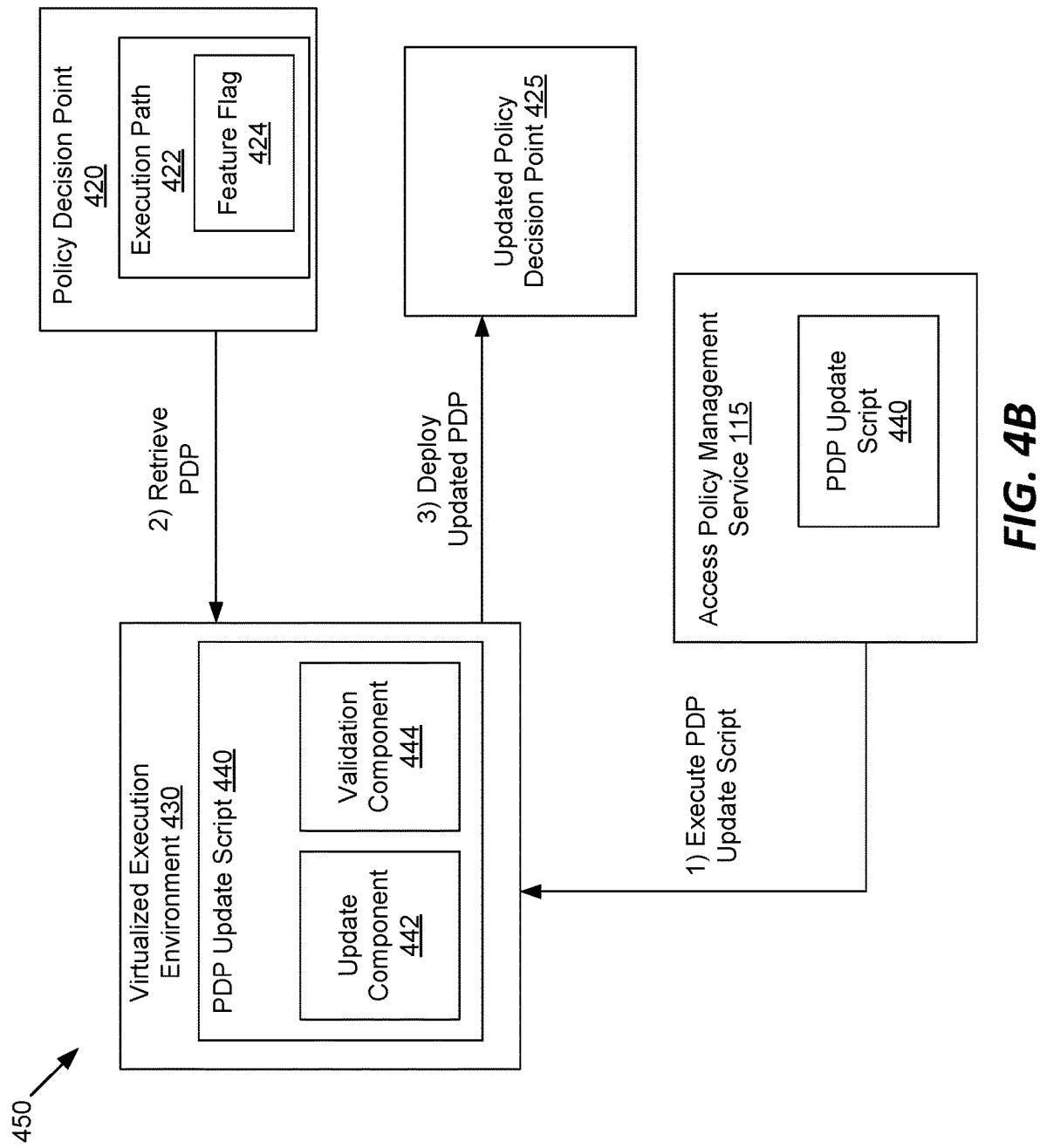
FIG. 4B depicts another example system for updating a policy decision point in a rule-based access control system, in accordance with some embodiments.

FIG. 4B is an example of a system 450 for access policy management in an RBAC system, in accordance with embodiments of the disclosure. System 450 depicts an access policy management service 115 for updating a PDP 420 based on the feature flags 424 annotating execution paths 422 described above with respect to FIG. 4A. In the depicted embodiment, the access policy management service 115 executes a PDP update script 440 within a virtualized execution environment 430. The virtualized execution environment 430 may be a virtual machine, a container, or any other virtualized environment. The PDP update script 440 may retrieve the PDP 420 as annotated with feature flags 424. In one example, an update component 442 of the PDP update script 440 may identify the execution paths 422 that have been annotated with the feature flag 424 and remove the identified execution paths 422 from the PDP 420. In another example, the update component 442 of the PDP update script 440 may independently identify the execution paths of the PDP 420 associated with the revoked service (e.g., via a service ID of the revoked service) and remove the identified execution paths from the PDP 420. The PDP update script 440 may further include a validation component 444 to test the updated PDP 425 to ensure that the updated PDP 425 operates as expected (e.g., no conflicts, first rule deny/allow, etc.) The PDP update script 440 may then deploy the updated PDP 425 in place of the old PDP 420. In some examples, the PDP update script 440 may shut down the RBAC system and launch the updated PDP 425. In other examples, the PDP update script 440 may deploy the updated PDP 425 and reroute all new incoming access requests to the updated PDP 425. The old PDP 420 may then be shut down once any remaining access requests/transactions previously received are evaluated.

Figure 5:
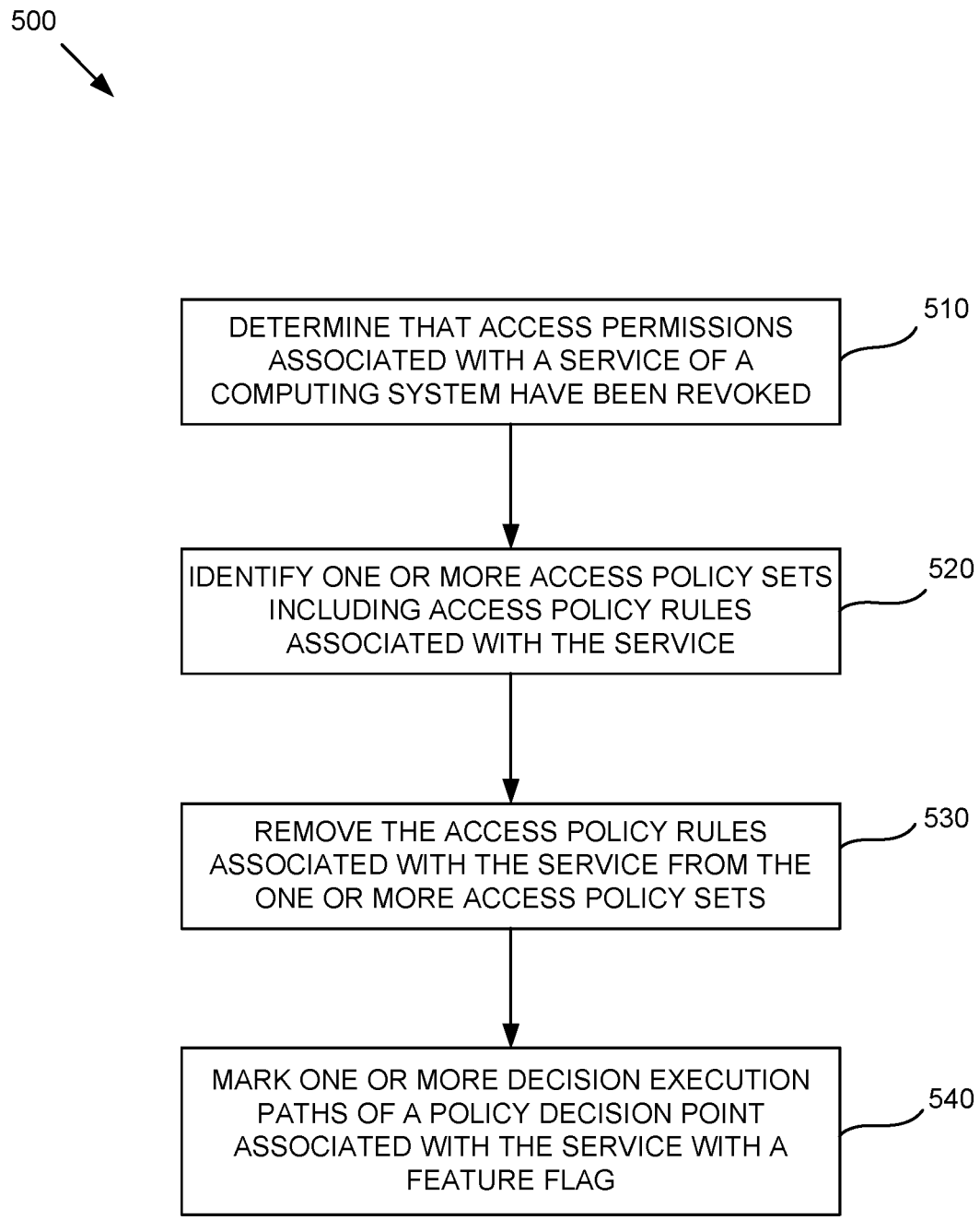
FIG. 5 is a flow diagram of a method of managing access policies in a rule-based access control system, in accordance with some embodiments.

FIG. 5 is a flow diagram of a method 500 of access policy management in an RBAC system, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by access policy management service 115 of RBAC system 140 of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic determines that access permissions associated with a service of a computing system have been revoked. In some examples, the computing system may be a role-based access control (RBAC) system in which access rules for services and devices are defined by roles and/or attributes of the services and devices. In some examples, determining that access permissions have been revoked may include determining that the service has been deleted, uninstalled, or otherwise removed from the computing system. For example, the computing system may be a mobile device and the processing logic may determine that a service (e.g., an application) has been removed from the mobile device. In some examples, the service may be removed automatically by an operating system of the device in response to determining that the service has been unused or otherwise inactive for a threshold period of time. The processing logic may store a service ID of the service used to define access policy rules in the RBAC system.

At block 520, the processing logic identifies one or more access policy sets including access policy rules associated with the service. The access policy sets may be policy documents including access policy rules defined in a format such as XML, JSON, plain text, or other simple markup or object format. In some examples, the policy sets may be defined according to the XACML standard for RBAC systems. Each policy rule in the policy set may be defined for a role or attribute of services or devices. In some examples, the policy rules may be defined for individual services or devices. In some examples, the processing logic can identify and retrieve each policy set that includes a reference to the service ID of the revoked service.

At block 530, the processing logic removes the access policy rules associated with the service from the one or more access policy sets. For example, the processing logic may identify and remove from the policy set documents each of the policy rules defined for the service for which permissions have been revoked. For examples, the processing logic may search the policy set documents to identify and remove any rules that include a reference to the service ID of the revoked service. Thus, all references to the service within the policy sets can be removed to avoid vulnerabilities associated with left over access rules (e.g., from spoofing of the service ID). The processing logic may further perform one or more validation and verification tests on the policy sets upon removal of the access policy rules of the service. The validation and verification, described in more detail below with respect to FIG. 7, may ensure that the updated policy sets operate as expected from a security perspective.

At block 540, the processing logic marks one or more decision execution paths of a policy decision point (PDP) associated with the service with a feature flag. The PDP may be a software service including hardcoded logical execution paths for assessing a resource access request. For example, the PDP may include chains of logical if-else statements for evaluating whether to allow or deny an access request. The PDP may retrieve the policy rules from the policy sets for performing the evaluations at the logical if-else statements. For example, if a policy rule is active one action is performed while if the policy rule is inactive then another action is performed. The chained if-else statements may thus result in many decision execution paths. The processing logic may identify the decision execution paths for the service and mark those paths with a feature flag. For evaluation of future access requests, the feature flag may indicate to the PDP that the decision execution path annotated with the feature flag is not to be executed. In some examples, the processing logic identifies each path that references the service ID of the revoked service and marks each of the paths with the feature flag.

In some examples, the processing logic further removes the one or more decision execution paths from the policy decision point to obtain an updated policy decision point. The processing logic may then perform a validation of the updated policy decision point, and in response to performing the validation, deploy the updated policy decision point in place of the policy decision point.

Figure 6:
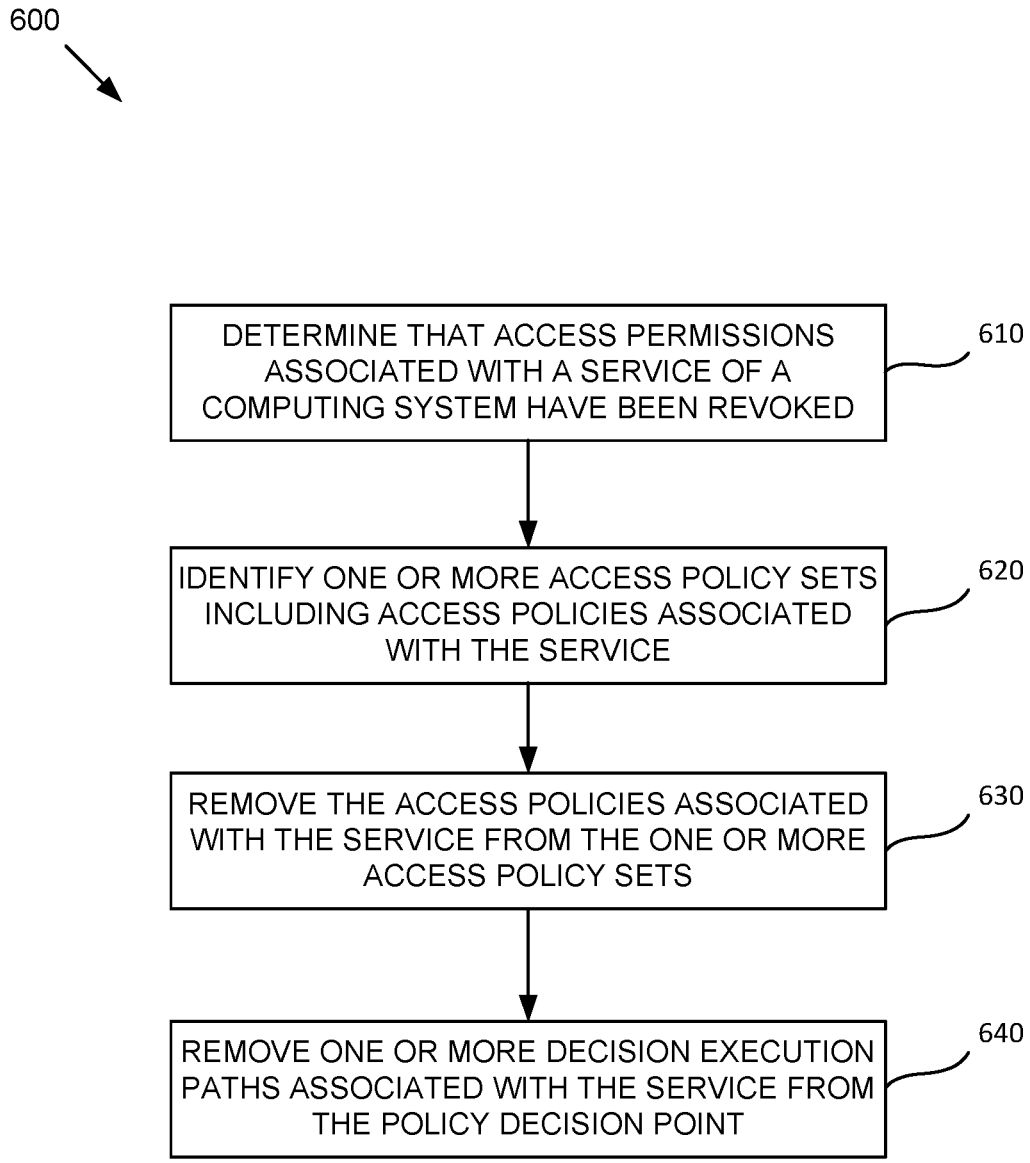
FIG. 6 is a flow diagram of another method of managing access policies in a rule-based access control system, in accordance with some embodiments.

FIG. 6 is a flow diagram of a method 600 of access policy management in an RBAC system, in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by access policy management service 115 of RBAC system 140 of FIG. 1.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Method 600 begins at block 610, where the processing logic determines that access permissions associated with a service of a computing system have been revoked. In some examples, the computing system may be a role-based access control (RBAC) system. In some examples, determining that access permissions have been revoked may include determining that the service has been deleted, uninstalled, or otherwise removed from the computing system. The processing logic may store a service ID of the service used to define access policy rules in the RBAC system.

At block 620, the processing logic identifies one or more access policy sets including access policies associated with the service. Each policy rule in the policy set may be defined for a role or attribute of services or devices. In some examples, the policy rules may be defined for individual services or devices. In some examples, the processing logic can identify and retrieve each policy set that includes a reference to the service ID of the revoked service.

At block 630, the processing logic remove the access policies associated with the service from the one or more policy sets. For example, the processing logic may use the service ID of the revoked service to search the policy set documents to identify and remove any rules that include a reference to the service ID. The processing logic may further perform one or more validation and verification tests on the policy sets upon removal of the access policy rules of the service. The validation and verification, described in more detail below with respect to FIG. 7, may ensure that the updated policy sets operate as expected from a security perspective.

At block 640, the processing logic removes one or more decision execution paths associated with the service from the policy decision point (PDP). The PDP may be software including several decision execution paths corresponding to code pathways executed in response to evaluating an access request against the access policy rules of the access policy sets. In some examples, the PDP may include hardcoded logical code paths (e.g., decision execution paths) that are associated with the revoked service. Therefore, after the access permissions for the service have been revoked and the access policy rules for the service have been removed from the policy sets, the logical code paths associated with the service are no longer valid and should not be executed. Therefore, the processing logic may identify and remove each of the logical code paths of the PDP that reference the service ID of the revoked service.

In another example, the processing logic may annotate each of the identified logical code paths with a feature flag. The processing logic may then generate a copy of the PDP (e.g., in a different execution environment from the current PDP) and remove the execution paths referencing the service. In some examples, the processing logic identifies and removes the execution paths that are annotated with the feature flag from the copy of the PDP. The processing logic then performs validation and verification of the updated PDP (e.g., with the execution paths associated with the service removed) to verify that the updated PDP operates as expected. Once verified to a certain degree of confidence, the processing logic deploys the updated PDP in place of the old PDP. In some examples, the processing logic may restart the RBAC system with the updated PDP. In another example, the processing logic may perform a failover scenario by rerouting the incoming access request traffic to the updated PDP and then tear down the old PDP.

Figure 7:
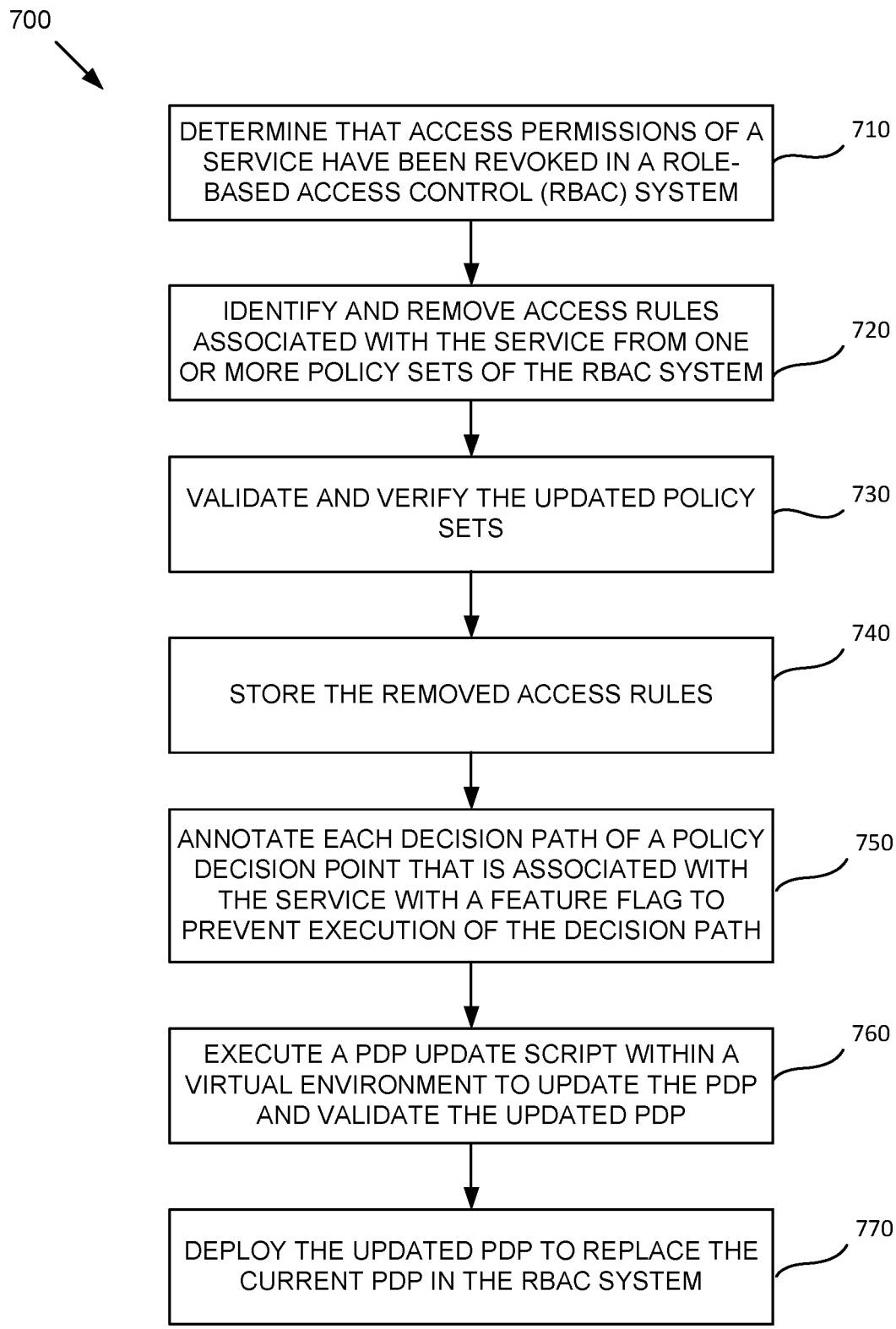
FIG. 7 is a flow diagram of another method of managing access policies in a rule-based access control system, in accordance with some embodiments.

FIG. 7 is a flow diagram of a method 700 of access policy management in an RBAC system, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by access policy management service 115 of RBAC system 140 of FIG. 1.

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Method 700 begins at block 710, where the processing logic determines that access permissions for a service have been revoked in a role-based access control (RBAC) system. In some examples, the processing logic may monitor for permissions changes at a service level. The processing logic may then identify when a service has been removed from the computing system and permissions for the service have been revoked. The processing logic may then determine and store a service ID associated with the service. The service ID may be a unique identifier of the service used to define access rules and to evaluate resource access requests from the service.

At block 720, the processing logic identifies and removes access rules associated with the service from one or more policy sets of the RBAC system. The RBAC system may include several policy sets including access policy rules for resource access. The policy sets may be documents or files in a particular format, such as XML, JSON, plain text, etc. stored at a policy retrieval point (PRP) of the RBAC system. The policy retrieval point may be a database of policy sets of the RBAC system. In some examples, the processing logic may perform a search of the policy sets to identify access policy rules that reference the revoked service. The processing logic may then remove the identified access rules from the policy sets and store the updated policy sets at the PRP. Accordingly, the processing logic may remove all references to the revoked service from the policy sets.

At block 730, the processing logic validates and verifies the updated policy sets. The validation and verification of the policy sets may validate that all of the references to the revoked service have been removed from the policy sets and verify that the resulting policy sets are valid. In some examples, the processing logic may run regression testing on the policy set to ensure that the removal of the access policy rules has not creates any conflicting scenarios within the policy sets when the policy sets are combined. Although access policy rules are individually defined, the policy rules and policy sets operate in a combinatorial and holistic manner in which the combination of all the rules is used to determine an outcome. Thus, conflicting scenarios in the policy sets may result in unpredictable and/or undesired results of the RBAC security. Example conflicts that may arise include situations in which an access request is allowed or denied by the first rule that triggers the action rather than continuing to evaluate the request against combinations of ruled. For example, the wrong execution path may be triggered which does not allow further evaluation of a combination of rules associated with the access request.

In some examples, any conflicts are flagged so the policy sets can be further modified to operate in an intended manner. For example, the processing logic may automatically relax or change rules affecting the flagged conflicts. In some examples, the processing logic may perform one or more machine learning techniques to identify where and why the conflicts or failures of the policy sets have occurred. Thus, the processing logic may identify and correct issues of the updated policies. In some examples, the processing logic may further modify policy sets by merging two or more policy sets for more streamlined and efficient management of the policy sets.

At block 740, the processing logic stores the removed access rules. The RBAC system may include storage of inactive access policy rules that have previously been removed from the active policy sets. Such inactive access policy rules may be stored for roll backs or reversions in case a vulnerability is introduced by the updated policy sets.

At block 750, the processing logic annotates each decisions path of a policy decision point of the RBAC system that is associated with the service with a feature flag to prevent execution of the decision path. The PDP may be a software service including logical execution paths for assessing a resource access request. The processing logic may identify the logical execution paths for the service and mark those paths with a feature flag. For evaluation of future access requests, the feature flag may indicate to the PDP that the logical execution path annotated with the feature flag is not to be executed. In some examples, the processing logic identifies each path that references the service ID of the revoked service and marks each of the paths with the feature flag. In some examples, the PDP may be comprised of a plurality of micro-services, each executing a subset of the logical execution paths of the PDP. In such an example, the processing logic may turn off the micro-services that are responsible for the identifies execution paths associated with the revoked service.

At block 760, the processing logic executes a PDP update script within a virtual environment to updated the PDP and validate the updated PDP. The virtual environment may include a virtual machine, container, or other environment in which the PDP update script can update and validate the updated PDP while the original current PDP continues to operate. For example, the processing logic may instantiate the virtual environment and copy the current PDP to the environment. The PDP update script may remove each of the execution paths annotated with the feature flag. The PDP update script may then verify that the updated PDP operates within expected parameters of the RBAC system. In some examples, the PDP update script or processing logic may run unit tests on the updated PDP. In some examples, the PDP update script may generate fake policies to run through the updated PDP to determine if the updated PDP outputs the expected results. If errors occur, the PDP update script may perform further analysis on the updated PDP to identify issues and update the PDP again until the updated PDP operates as expected.

At block 770, the processing logic deploys the updated PDP to replace the current PDP within the RBAC system. The processing logic may deploy the updated PDP in response to validating that the updated PDP operates within expected parameters. In some examples, deploying the updated PDP may include shutting down the RBAC system and relaunching with the updated PDP. Alternatively, deploying the updated PDP may include rerouting newly received access request transactions to the updated PDP and shutting down the old PDP once all the previously received transactions have been evaluated. Therefore, the RBAC system may be fully updated to remove access policy rules and code in the RBAC system that refers to the revoked service.

Figure 8:
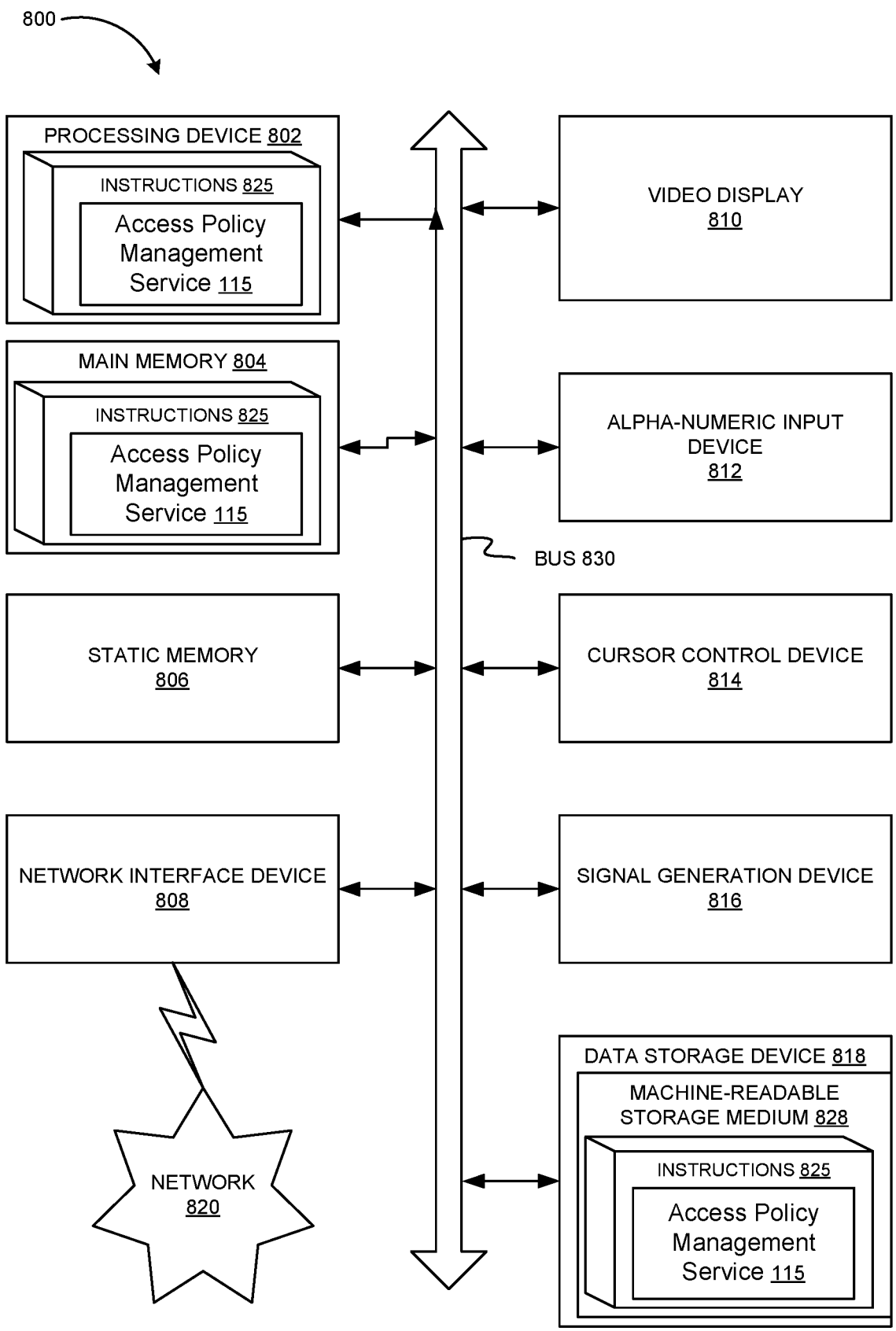
FIG. 8 is a block diagram of an example apparatus that may perform one or more of the operations described herein, in accordance with some embodiments of the present disclosure.

FIG. 8 is a block diagram of an example computing device 800 that may perform one or more of the operations described herein, in accordance with some embodiments. Computing device 800 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 800 may include a processing device (e.g., a general purpose processor, a PLD, etc.) 802, a main memory 804 (e.g., synchronous dynamic random access memory (DRAM), read-only memory (ROM)), a static memory 806 (e.g., flash memory and a data storage device 818), which may communicate with each other via a bus 830.

Processing device 802 may be provided by one or more general-purpose processing devices such as a microprocessor, central processing unit, or the like. In an illustrative example, processing device 802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may also comprise one or more special-purpose processing devices such as an application specific integrated circuit (ASIC), a field programmable gate array (FPGA), a digital signal processor (DSP), network processor, or the like. The processing device 802 may be configured to execute the operations described herein, in accordance with one or more aspects of the present disclosure, for performing the operations and steps discussed herein.

Computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of instructions 825 that may include instructions for an access policy management service, e.g., access policy management service 115 for carrying out the operations described herein, in accordance with one or more aspects of the present disclosure. Instructions 825 may also reside, completely or at least partially, within main memory 804 and/or within processing device 802 during execution thereof by computing device 800, main memory 804 and processing device 802 also constituting computer-readable media. The instructions 825 may further be transmitted or received over a network 820 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method including determining that access permissions associated with a service of a computing system have been revoked, identifying one or more access policy sets including access policy rules associated with the service, removing the access policy rules associated with the service from the one or more access policy sets, and marking one or more decision execution paths of a policy decision point associated with the service with a feature flag.

Example 2 is the method of Example 1, wherein the computing system is a rule-based access control (RBAC) system.

Example 3 is the method of any of Examples 1 or 2, wherein the access policy rules associated with the service are identified in view of a service identifier of the service.

Example 4 is the method of any of Examples 1-3, wherein the feature flag indicates for the policy decision point to prevent execution of the decision execution path associated with the feature flag.

Example 5 is the method of any of Examples 1-4 wherein determining that access permissions associated with the service of the computing system have been revoked is in response to determining that the service has been removed from the computing system.

Example 6 is the method of any of Examples 1-5 further including removing the one or more decision execution paths from the policy decision point to obtain an updated policy decision point.

Example 7 is the method of any of Examples 1-6 further including performing a validation of the updated policy decision point and in response to performing the validation, deploying the updated policy decision point in place of the policy decision point.

Example 8 a system including a memory and a processing device, operatively coupled to the memory, to determine that access permissions associated with a service of a computing system have been revoked, identify one or more access policy sets including access policy rules associated with the service, remove the access policy rules associated with the service from the one or more access policy sets, and marking one or more decision execution paths of a policy decision point associated with the service with a feature flag.

Example 9 is the system of any one of Example 8, wherein the computing system is a rule-based access control (RBAC) system.

Example 10 is the system of any one of Examples 8 or 9 wherein the access policy rules associated with the service are identified in view of a service identifier of the service.

Example 11 is the system of any one of Examples 8-10 wherein the feature flag indicates for the policy decision point to prevent execution of the decision execution path associated with the feature flag.

Example 12 is the system of any one of Examples 8-11 wherein the processing device determines that access permissions associated with the service of the computing system have been revoked in response to determining that the service has been removed from the computing system.

Example 13 is the system of any one of Examples 8-12 wherein the processing device is further to remove the one or more decision execution paths from the policy decision point to obtain an updated policy decision point.

Example 14 is the system of any one of Examples 8-13 wherein the processing device is further to perform a validation of the updated policy decision point and in response to performing the validation, deploy the updated policy decision point in place of the policy decision point.

Example 15 is a non-transitory computer-readable storage medium including instructions that, when executed by a processing device, cause the processing device to determine that access permissions associated with a service of a computing system have been revoked, identify one or more access policy sets including access policy rules associated with the service, remove the access policy rules associated with the service from the one or more access policy sets; and mark one or more decision execution paths of a policy decision point associated with the service with a feature flag.

Example 16 is the non-transitory computer-readable storage medium of Example 15, wherein the computing system is a rule-based access control (RBAC) system.

Example 17 is the non-transitory computer-readable storage medium of Examples 15 or 16, wherein the access policy rules associated with the service are identified in view of a service identifier of the service.

Example 18 is the non-transitory computer-readable storage medium of any one of Examples 15-17, wherein the feature flag indicates for the policy decision point to prevent execution of the decision execution path associated with the feature flag.

Example 19 is the non-transitory computer-readable storage medium of any one of Examples 15-18, wherein the processing device determines that access permissions associated with the service of the computing system have been revoked in response to determining that the service has been removed from the computing system.

Example 20 is the non-transitory computer-readable storage medium of any one of Examples 15-19, wherein the processing device is further to remove the one or more decision execution paths from the policy decision point to obtain an updated policy decision point.

Example 21 is a method including determining that access permissions associated with a service of a computing system have been revoked, identifying one or more access policy sets including access policies associated with the service, removing the access policies associated with the service from the one or more access policy sets, and removing, by the processing device, one or more decision execution paths associated with the service from a policy decision point.

Example 22 is the method of Example 21, wherein the computing system is a rule-based access control (RBAC) system.

Example 23 is the method of Examples 21 or 22, wherein removing the one or more decision execution paths from the policy decision point includes performing a validation of the policy decision point within a virtualized execution environment and redeploying the policy decision point to the computing system as updated.

Example 24 is the method of any one of Examples 21-23, wherein the virtualized execution environment is a virtual machine.

Example 25 is the method of any one of Examples 21-24, wherein determining that access permissions associated with the service of the computing system have been revoked is in response to determining that the service has been removed from the computing system.

Example 26 is the method of any one of Examples 21-25, further including marking the one or more decision execution paths of the policy decision point with a feature flag.

Example 27 is the method of any one of Examples 21-26 wherein removing the one or more decision execution paths associated with the service from the policy decision point includes removing the one or more decision execution paths associated with the feature flag.

Example 28 is a system including a memory and a processing device, operatively coupled to the memory, to determine that access permissions associated with a service of a computing system have been revoked, identify one or more access policy sets including access policies associated with the service, remove the access policies associated with the service from the one or more access policy sets, mark one or more decision execution paths of a policy decision point associated with the service with a feature flag, and remove the one or more decision execution paths associated with the feature flag from a policy decision point.

Example 29 is the system of Example 28, wherein the processing device is further to perform a validation of the policy decision point within a virtualized execution environment and redeploying the policy decision point to the computing system as updated.

Example 30 is an apparatus including means for determining that access permissions associated with a service of a computing system have been revoked, means for identifying one or more access policy sets including access policies associated with the service, means for removing the access policies associated with the service from the one or more access policy sets, means for marking one or more decision execution paths of a policy decision point associated with the service with a feature flag, and means for removing the one or more decision execution paths marked with the feature flag from a policy decision point.

Example 31 is the apparatus of Example 30, further including means for performing a validation of the policy decision point within a virtualized execution environment and means for redeploying the policy decision point to the computing system as updated.

Example 32 is the apparatus of Examples 30 or 31, wherein the means for removing the one or more decision execution paths associated with the service from the policy decision point includes means for removing the one or more decision execution paths marked with the feature flag.

Example 33 is the apparatus of any one of Examples 30-32, further including means for determining that the service has been removed from the computing system.

Example 34 is the apparatus of any one of Examples 30-33, wherein the computing system is a rule-based access control (RBAC) system.

Example 35 is the apparatus of any one of Examples 30-34, wherein the feature flag indicates for the policy decision point to prevent execution of the one or more decision execution paths associated with the feature flag.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    determining that access permissions associated with a service of a computing system have been revoked;
    identifying one or more access policy sets comprising access policy rules associated with the service;
    removing, by a processing device, the access policy rules associated with the service from the one or more access policy sets;
    marking, by the processing device, one or more decision execution paths of a policy decision point associated with the service with a feature flag, the policy decision point comprising a software service to implement the access policy rules; and
    preventing execution of the one or more decision execution paths of the policy decision point that are marked with the feature flag.

2. The method of claim 1, wherein the computing system is a rule-based access control (RBAC) system.

3. The method of claim 1, wherein the access policy rules associated with the service are identified in view of a service identifier of the service.

4. The method of claim 1, wherein the feature flag indicates for the policy decision point to prevent execution of the decision execution path associated with the feature flag.

5. The method of claim 1, wherein determining that access permissions associated with the service of the computing system have been revoked is in response to determining that the service has been removed from the computing system.

6. The method of claim 1, further comprising:
removing the one or more decision execution paths from the policy decision point to obtain an updated policy decision point.

7. The method of claim 6, further comprising:
performing a validation of the updated policy decision point; and
in response to performing the validation, deploying the updated policy decision point in place of the policy decision point.

8. A system comprising:
a memory; and
a processing device, operatively coupled to the memory, to:
determine that access permissions associated with a service of a computing system have been revoked;
identify one or more access policy sets comprising access policy rules associated with the service;
remove the access policy rules associated with the service from the one or more access policy sets;
marking one or more decision execution paths of a policy decision point associated with the service with a feature flag, the policy decision point comprising a software service to implement the access policy rules; and
prevent execution of the one or more decision execution paths of the policy decision point that are marked with the feature flag.

9. The system of claim 8, wherein the computing system is a rule-based access control (RBAC) system.

10. The system of claim 8, wherein the access policy rules associated with the service are identified in view of a service identifier of the service.

11. The system of claim 8, wherein the feature flag indicates for the policy decision point to prevent execution of the decision execution path associated with the feature flag.

12. The system of claim 8, wherein the processing device determines that access permissions associated with the service of the computing system have been revoked in response to determining that the service has been removed from the computing system.

13. The system of claim 8, wherein the processing device is further to:
remove the one or more decision execution paths from the policy decision point to obtain an updated policy decision point.

14. The system of claim 13, wherein the processing device is further to:
perform a validation of the updated policy decision point; and
in response to performing the validation, deploy the updated policy decision point in place of the policy decision point.

15. A non-transitory computer readable storage medium including instructions stored therein, that when executed by a processing device, cause the processing device to:
determine that access permissions associated with a service of a computing system have been revoked;
identify one or more access policy sets comprising access policy rules associated with the service;
remove, by the processing device, the access policy rules associated with the service from the one or more access policy sets;
mark, by the processing device, one or more decision execution paths of a policy decision point associated with the service with a feature flag, the policy decision point comprising a software service to implement the access policy rules; and
prevent execution of the one or more decision execution paths of the policy decision point that are marked with the feature flag.

16. The non-transitory computer readable storage medium of claim 15, wherein the computing system is a rule-based access control (RBAC) system.

17. The non-transitory computer readable storage medium of claim 15, wherein the access policy rules associated with the service are identified in view of a service identifier of the service.

18. The non-transitory computer readable storage medium of claim 15, wherein the feature flag indicates for the policy decision point to prevent execution of the decision execution path associated with the feature flag.

19. The non-transitory computer readable storage medium of claim 15, wherein the processing device determines that access permissions associated with the service of the computing system have been revoked in response to determining that the service has been removed from the computing system.

20. The non-transitory computer readable storage medium of claim 15, wherein the processing device is further to:
remove the one or more decision execution paths from the policy decision point to obtain an updated policy decision point.

* * * * *